United States Patent [19]

Chandler et al.

[11] Patent Number: 4,536,869
[45] Date of Patent: Aug. 20, 1985

[54] OPTICAL DISK ASSEMBLY

[75] Inventors: Jasper S. Chandler; Frederick F. Geyer, both of Rochester, N.Y.

[73] Assignee: Eastman Kodak Company, Rochester, N.Y.

[21] Appl. No.: 458,494

[22] Filed: Jan. 17, 1983

[51] Int. Cl.³ .............................................. G01D 15/32
[52] U.S. Cl. .................. 369/287; 346/135.1; 346/137; 369/284
[58] Field of Search .................. 369/284, 286, 287; 346/135.1, 137; 160/392

[56] References Cited

U.S. PATENT DOCUMENTS 4,365,258 12/1982 Geyer et al. ...................... 369/284
4,453,246 6/1984 Covington ........................ 369/291

Primary Examiner—Steven L. Stephan
Attorney, Agent, or Firm—Milton S. Sales

[57] ABSTRACT

An optical disk assembly includes a flexible disk-shaped support carrying a record layer. The support has an information storage region. An annular retaining ring engages the annular peripheral region of the support. The support, and preferably a cover sheet, are captured between the outer annular reference ring member and an inner annular reference ring member which has been conically deformed to spring toward the outer ring member.

7 Claims, 7 Drawing Figures

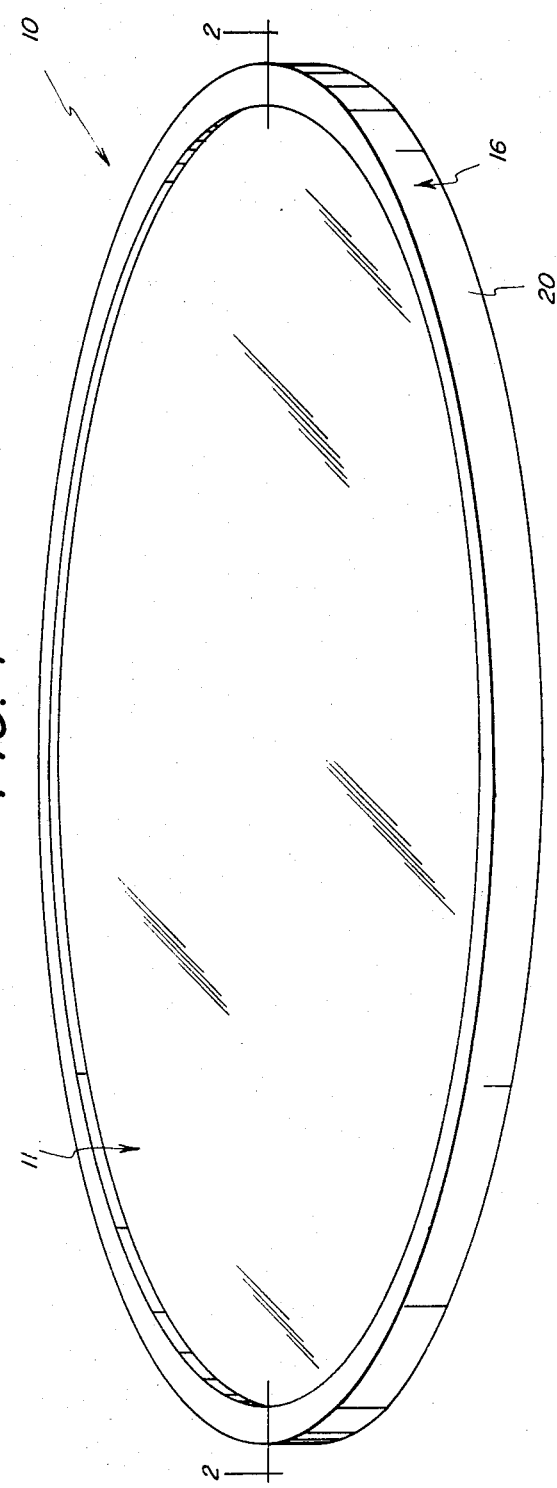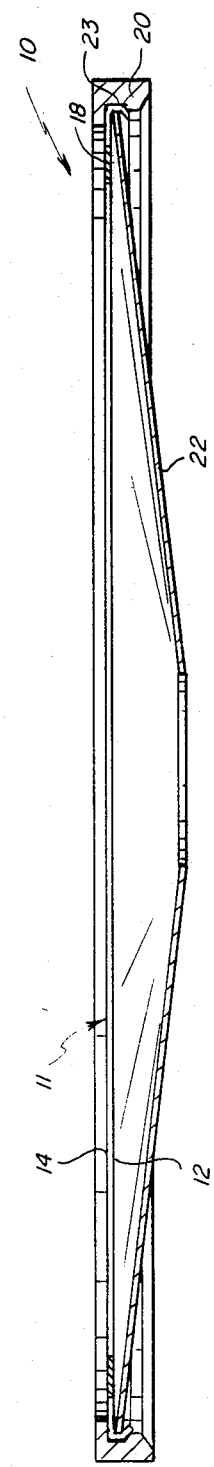

OPTICAL DISK ASSEMBLY

CROSS-REFERENCE TO RELATED APPLICATION

Reference is made herein to commonly-assigned, copending U.S. patent application Ser. No. 264,313, filed May 18, 1981 in the names of F. F. Geyer and E. M. Leonard.

BACKGROUND OF THE INVENTION

1. Field of the Invention

The present invention relates to record medium assemblies useful in high density storage of information by optical writing and/or reading, and more particularly to improved configurations for optical disk assembly retaining rings.

2. Description of the Prior Art

The currently preferred optical disk technology employs disk elements with spiral or concentric tracks of minute (e.g., on the order of a micron or less in size), optically-detectable marks. One real-time mode of recording (writing) such marks is by scanning tracks on the disk with an equivalently small beam of radiation (e.g., from a laser) which is modulated "off or on" according to an electrical signal representative of the information to be written. Information is recovered (read) by scanning the tracks with the same size or only slightly larger, but still very tightly focused, radiation (e.g. light) spot. The recovered information is in the form of a fluctuating electrical signal obtained from a photodetector that senses the read-out light reflected from the recorded disk.

In order to write and read information in the form of such minute markings, optical systems of high numerical aperture are used to focus light to equivalently minute spots. Such optical systems have extremely small depths of focus and the proper positional relation between the writing or reading optical system, and the optical disk record surface must be stringently maintained both smooth and flat.

One approach to achieve requisite smoothness, flatness and protective requirements for high density storage of information is disclosed in commonly-assigned, copending U.S. patent application Ser. No. 264,313, filed May 18, 1981 in the names of F. F. Geyer and E. M. Leonard. In that approach an improved optical disk assembly adapted for high density storage of information comprises (i) a flexible, disk-shaped support carrying a record layer; (ii) a transparent disk-shaped cover sheet opposing the record layer, and (iii) an annular retaining ring for holding the support and cover sheet in tension.

Attachment of the support and cover sheet to the retaining ring should be done such that the tension in the support and cover sheet is substantially circumferentially-symmetric, and such that the tension is held after attachment. The present invention provides for such attachment of the support and cover sheet to the retaining ring and further provides a surface for accurately centering the disk assembly on rotatable receiving structure of optical disk write/read apparatus such that information tracks on the record layer are closely concentric with the axis of rotation of the receiving structure. The greater the amount of eccentricity of the mounted disk assembly, the more difficult it is for the write/read optics to follow the information tracks.

SUMMARY OF THE INVENTION

By the present invention, improved tensioning of the support and cover sheet is achieved, and manufacturing operations are simplified. Centering of the disk assembly on the write/read apparatus is enhanced.

An optical disk assembly in accordance with the invention includes a flexible disk-shaped support carrying a record layer. The support has an information storage region. An annular retaining ring engages the annular peripheral region of the support. The support, and preferably a cover sheet, are captured between the outer annular reference ring member and an inner annular reference ring member, the inner ring member being resiliently urged toward the outer ring member. In a preferred embodiment, the inner ring member is resiliently deformed to spring toward the outer ring member. Such deformation may be by stressing the inner ring member into a conical shape.

The invention and its objects and advantages, will become more apparent in the detailed description of the preferred embodiment presented below.

BRIEF DESCRIPTION OF THE DRAWINGS

The description of preferred embodiment refers to the attached drawings wherein:

FIG. 1 is a perspective schematic view of an optical disk assembly according to the present invention;

FIG. 2 is a sectional view taken along line 2—2 of FIG. 1;

DESCRIPTION OF THE PREFERRED EMBODIMENTS

Referring to FIGS. 1 and 2, an optical disk assembly 10 includes a web assembly 11 having a flexible, disk-shaped support 12 carrying a record layer (and other appropriate layers) on one major surface of the support. The web assembly also includes a continuous, flexible, disk-shaped cover sheet 14 which is substantially transparent with respect to the write and/or read wavelength suitable for use with the record layer. The diameter of cover sheet 14 corresponds generally to the diameter of support 12.

Figure 3:
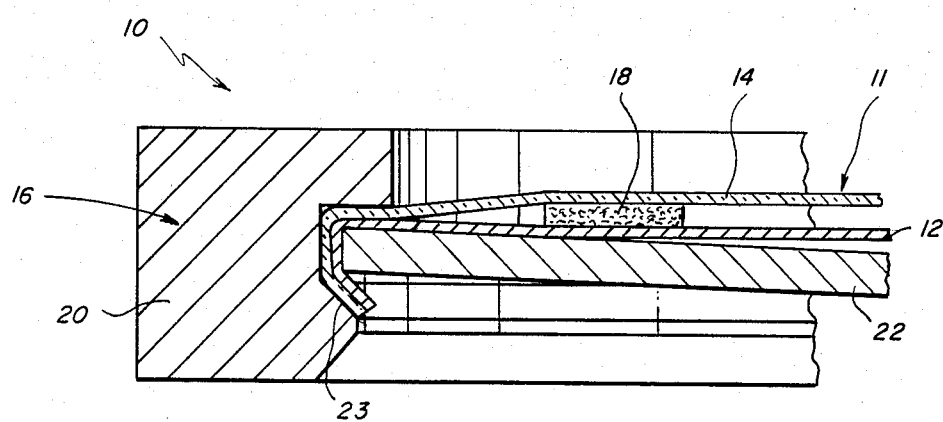
FIG. 3 is an enlarged, fragmented view of a portion of FIG. 2.

As best seen in FIG. 3, the support and cover sheet are held in spaced relation by an annular retaining ring 16 and spacer 18. The retaining ring engages support 12 and cover sheet 14 substantially continuously at respective annular peripheral portions thereof. The web assembly has a predetermined information storage region radially inwardly of spacer 18. Reference is made to aforementioned U.S. patent application Ser. No. 264,313 for a description of useful and preferred materials and characteristics for the disk-shaped support and the cover sheet.

The web assembly is retained in circumferentially-symmetric tension by cooperating outer and inner annular ring members 20 and 22, respectively, of retaining ring 16 engaging opposed sides of the peripheral region of the web assembly. Although referred to herein as outer and inner ring members, it will be appreciated that only a portion of ring member 22 need be radially inward of a portion of ring member 20.

It is preferred that the cooperative engagement between disk-shaped support 12, cover sheet 14, and retaining ring 16 seal the space between the record layer on support 12 and the opposed surface of cover sheet 14. Although not included in the illustrated embodiments, the optical disk assembly may have a central rigid hub including spacing means for sealing and maintaining proper spacing between the record layer and the cover sheet.

Preferred tensions for the disk-shaped support and cover sheet materials are from substantially zero to just below the elastic limit, or yield point, of those materials. More specifically, the preferred tensions depend upon the desired degree of planarity for the particular member (i.e. size, composition, etc.). It is preferred that support material tension be below the elastic limit of the particular material; however, in certain applications some yield can be acceptable as long as surface planarity remains in the desired tolerance. In general, the tension should be selected with respect to the support material so that the stressed material's continuous relaxation over time (i.e. material creep) is slow enough to insure adequate spacing and planarizing tension throughout the expected product life period.

As best seen in FIG. 3, outer and inner members 20 and 22, respectively, capture support 12 and cover sheet 14 therebetween. The capture is firm because inner ring member 22 has been conically deformed to spring toward abstract surface 23 of outer ring member 20. A method for deforming the inner ring member and assembling the parts will be described below.

Any growth in outer ring 20, due for example to thermal expansion, is compensated for by an expansion in the outer perimeter of inner ring member 22 as the deformation of the inner ring member decreases. This assures that support 12 and cover sheet 14 will remain securely captured between the ring members.

During use, optical disk assembly 10 is mountable on disk assembly receiving structure 24 which forms part of optical disk write/read apparatus. The optical disk write/read apparatus is similar to the various other such apparatus known in the art, and only disk assembly receiving structure 24 which cooperates more directly with the present disk assembly will be described in detail.

Disk assembly receiving structure 24 comprises a turntable 26 adapted for rotation about axis 28 by drive means (not shown). The optical disk write/read apparatus also includes an optics system, represented by lens 30, which is adapted to focus write/read light in a focal plane that is normal to axis 28.

Figure 4:
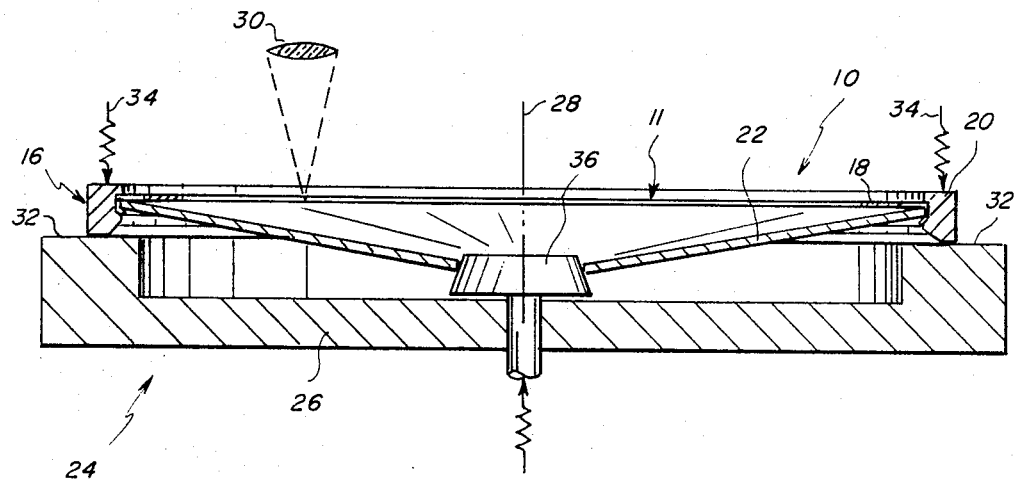
FIG. 4 is a sectional view of the optical disk assembly mounted on optical disk write/read apparatus.

A reference ring locating surface 32 on turntable 26 rotates in a plane substantially normal to axis 28. Locating surface 32 is positioned to be engaged by reference ring 16, which is held on the locating surface by clamps, magnetics, resilient spring force, or other suitable means, depicted schematically in FIG. 4 by force arrows 34. Locating surface 32 has predetermined dimensions with respect to the focal plane of the optics system of the disk write/read apparatus and the axial position of support in reference ring 16 so that the recording layer of a disk assembly located on the turntable will closely proximate a nominal focal plane position of lens 30.

Turntable 26 has a rotatable, conically-shaped spindle 36 mounted for axial movement along axis 28. The spindle is resiliently urged upwardly to engage the inside diameter surface of inner ring member 22 before outer ring member 20 engages locating surface 32 when optical disk assembly 10 is placed over turntable 26. This allows the disk assembly to center itself about the spindle before contact is made between the outer ring member and the turntable. Thus, centering forces need not overcome friction at the outer ring. It is noted that centering from the smaller diameter of the inside of ring member 22 is more desirable than from the larger diameter of ring member 20 because the effect of thermal expansion on the smaller diameter is less than on the larger diameter.

Figure 5:
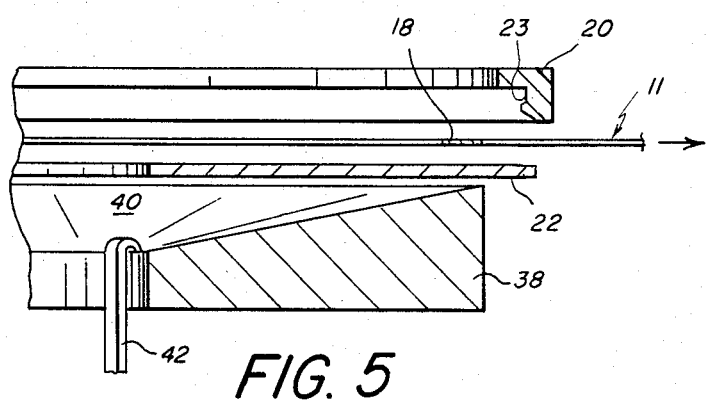
FIGS. 5-7 are sequential sectional views showing a process for manufacturing the optical disk assembly of FIG. 1.
Figure 6:
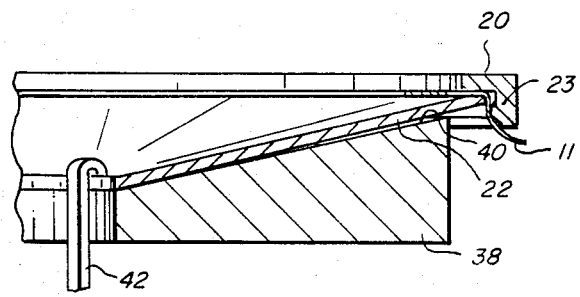
Figure 7:
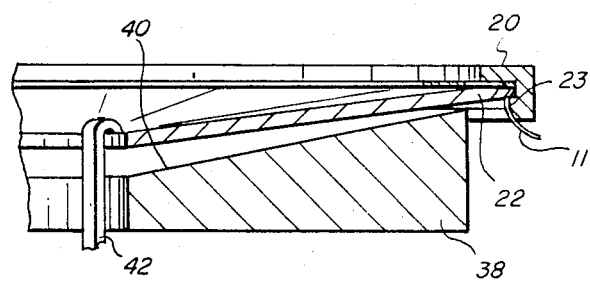

FIGS. 5-7 illustrate a preferred assembly method for manufacture. Referring to FIG. 5, an assemblage including web assembly 11 (with support 12, cover sheet 14, and annular spacer 18) is placed under circumferentially-symmetric radial tension with coaxially aligned ring members 20 and 22 on opposed sides thereof. Note that inner ring member 22 is relaxed and, as such, is planar.

The assemblage is positioned over a fixture 38 having a conical surface 40 and a plurality of hooked fingers, one of which being shown at 42. Fingers 42 are raised through the hole in ring member 22 and hook over the inner edge of the ring member. By drawing the fingers downwardly, the ring member is pulled into the recess in fixture 38 and assumes a conical shape. This stresses the ring member and reduces its outer diameter.

With the outer diameter of ring member 22 reduced in this manner, outer ring member 20 is lowered over the inner ring member while tension is maintained in web assembly 11 (FIG. 6). Hooked fingers 42 are raised, allowing stressed ring member 22 to spring back toward its original, flat configuration until its outer periphery engages an inner surface of ring member 20, and captures web assembly 11 therebetween.

The force from ring member 22 is sufficient to prevent radially inward slippage of the tensioned web assembly, and the web assembly can be trimmed beyond the capture locus. Hooked fingers 42 are now removed, and assembly is complete.

The invention has been described in detail with particular reference to certain preferred embodiments thereof, but it will be understood that variations and modifications can be effected within the spirit and scope of the invention.

What is claimed is:

1. An optical disk assembly comprising:
   a flexible, disk-shaped support carrying a record layer, said support having an information storage region and an annular peripheral region radially outward of said storage region; and
   an annular retaining ring engaging said peripheral region of said support, said retaining ring comprising outer and inner ring members on radially opposed sides of said support, and said inner ring member being resiliently inwardly deformed to reduce its outer diameter so as to be urged toward said outer ring member to capture said support therebetween.

2. An optical disk assembly comprising:
   a flexible, disk-shaped support carrying a record layer, said support having an information storage region and an annular peripheral region radially outward of said storage region; and
   an annular retaining ring engaging said peripheral region of said support, said retaining ring comprising outer and inner ring members on radially opposed sides of said support, said inner ring member being resiliently deformed into a conical shape to spring toward said outer ring member and capture said support therebetween.

3. An optical disk assembly comprising:
a flexible, disk-shaped web assembly including (1) a support carrying a record layer and (2) a cover sheet spaced from and opposing said record layer, said web assembly having an information storage region and an annular peripheral region radially outward of said storage region; and
an annular retaining ring engaging said peripheral region of said web assembly, said retaining ring comprising outer and inner ring members on radially opposed sides of said web assembly, said inner ring member being resiliently inwardly deformed to reduce its outer diameter so as to exert a spring force toward said outer ring member to capture said web assembly therebetween.

4. An optical disk assembly comprising:
a flexible, disk-shaped web assembly including (1) a support carrying a record layer and (2) a cover sheet spaced from and opposing said record layer, said web assembly having an information storage region and an annular peripheral region radially outward of said storage region; and
an annular retaining ring engaging said peripheral region of said web assembly, said retaining ring comprising outer and inner ring members on radially opposed sides of said web assembly, said inner ring member being resiliently deformed into a conical shape to exert a spring force toward said outer ring member to capture said web assembly therebetween.

5. An optical disk assembly comprising:
a flexible, disk-shaped web assembly including (1) a support carrying a record layer and (2) a cover sheet spaced from and opposing said record layer, said web assembly having an information storage region and an annular peripheral region radially outward of said storage region;
an outer retaining ring member having an annular, radially inwardly facing abutment surface; and
an annular inner retaining ring member having inner and outer concentric diameters and being resiliently, conically deformable such that: (1) said outer diameter is larger than said abutment surface when said inner ring member is undeformed and is smaller than said abutment surface when said inner ring member is conically deformed, (2) said inner diameter provides a surface for accurately centering said disk assembly on rotatable receiving structure of optical disk write/read apparatus.

6. The method of making an optical disk assembly from (1) a flexible, disk-shaped web assembly including a support, a record layer on the support, a cover sheet spaced from and opposing the record layer, an information storage region on the support, and an annular peripheral region on the support radially outward of the storage region, (2) an annular outer retaining ring member with an annular inwardly facing abutment surface, and (3) an annular inner retaining ring member having an outer diameter larger than the diameter of the abutment surface, and being conically deformable to a configuration with an outer diameter smaller than the diameter of the abutment surface; said method including the steps of:
placing the web assembly in circumferentially-symmetric radial tension;
conically deforming the inner ring member to resiliently reduce its outer diameter;
coaxially engaging opposed sides of the tensioned web assembly with the outer and inner ring members, respectively, and closing the ring members upon each other such that the inner ring member is at least partly inside of the outer ring member; and
permitting the inner ring member to spring back toward its undeformed configuration to engage the abutment surface of the outer ring member with the web assembly captured therebetween.

7. An optical disk assembly comprising
a flexible, disk-shaped support carrying a record layer, said support having an information storage region and an annular peripheral region radially outward of said storage region; and
an annular retaining ring engaging said peripheral region of said support, said retaining ring comprising:
(a) an annular outer ring member with an annular inwardly facing abutment surface, and
(b) an annular inner retaining ring member having been conically deformed to reduce its outer diameter to engage said abutment surface with the peripheral region of said support being radially between said outer diameter and said abutment surface whereby said support is captured.

* * * * *